UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

MANUFACTURE OF PHENOLIC CONDENSATION PRODUCTS.

1,358,394. Specification of Letters Patent. Patented Nov. 9, 1920.

No Drawing. Application filed March 10, 1919. Serial No. 281,623.

*To all whom it may concern:*

Be it known that we, LAWRENCE V. REDMAN, a citizen of Canada, residing in Evanston, Cook county, Illinois, and ARCHIE J. WEITH and FRANK P. BROCK, citizens of the United States, residing at Chicago, in the county of Cook and State of Illinois, have invented a new and useful Improvement in the Manufacture of Phenolic Condensation Products, of which the following is a specification.

This invention relates particularly to the production of phenolic condensation products and especially molded products.

As is known, a phenolic condensation product is produced by combining a phenolic body, such as phenol or its homologues, with an active methylene substance, such as hexamethylenetetramin or formaldehyde, containing the methylene radical.

It is well known that a phenolic condensation product (usually having a filler introduced therein) may be molded in hot presses and discharged hot or cold, as desired. It has been proposed, also, to mix a phenolic condensation product with a filler and mold the same in the regular manner of cold-molded products, the final hardening being effected by subjecting the molded article to the action of heat after its removal from the mold. Thus, in patent to Hemming No. 1,125,906, granted January 19, 1915, it was proposed to prepare an initial product of phenol and formaldehyde (the latter in decided excess); arrest the reaction when a soluble resin of sp. gr. from 1.15 to 1.21 had been produced; mix this binder with a filler; and then mold the mixture, and harden by heat treatment. This calls for a reaction in the molded product in which water is formed as a by-product and must be eliminated by heat, tending to the production of a spongy and otherwise inferior product. Moreover, difficulty has been experienced in securing resins of proper consistency to permit the mass to be properly kneaded and afterward properly molded by a cold-molding process. This is due partly to the volatile nature of formaldehyde, and the difficulty of determining the loss of methylene. It has been proposed, also, to use such solvents as alcohol, acetone, etc., in an effort to secure the proper consistency and the proper coherency in the molding operation, but this involves additional expense for materials not useful in the product and is otherwise objectionable, and especially so because of the difficulty of securing the resin in a stage of reaction at which it is best adapted for the purpose.

The present invention constitutes an improvement upon the invention set forth in our application No. 238,479, filed June 6, 1918. Prior to the invention described in said application, so far as we are aware, no method of cold-molding phenolic condensation products has proven practicable, or found its way into general use. The primary object of the present invention is to provide an improved practicable method whereby phenolic condensation products may be subjected to a short molding operation at ordinary or moderate temperatures, and subsequently hardened by heat treatment after removal from the molds. By such a method, the output of the molds may be increased many fold; and, as will be immediately appreciated, this results in an enormous saving in the cost of molds, the cost of presses, the cost of labor, and in the cost of production, generally. The present invention renders it entirely practicable for a manufacturer of phenolic condensation products to supply to manufacturers of molded products a phenolic condensation product suitable for use in producing a molding compound adapted to a quick-molding process, after which the molded article may be converted to a hard and practically infusible state by prolonged heat treatment, after removal from the mold. One advantage of the improved process described in the present application is that it makes it comparatively easy for a manufacturer of molded products to produce a molding compound comprising a phenolic condensation product without the aid or employment of chemists who are especially skilled in the production of phenolic condensation products. A further advantage of the present process is that it may be practised with the greatest certainty of uniformity in results, without the exercise of any extraordinary care, as, for instance, in determining the stage at which the re-action is to be stopped in order to obtain an initial fusible condensation product which is well adapted for use in the subsequent steps of producing a molding compound adapted to the practice of the quick-molding process The difficulties indicated above as characterizing the efforts of prior inventors to produce a quick-molding process for phenolic condensation products are obviated, and molding compounds adapted to quick-molding operation and subsequent conversion to a hard and practically infusible state by subsequent heat treatment out of the mold, are produced by the improved process herein described.

In the application referred to above, a process is described which involves the use of a fusible phenolic condensation product containing about 1½ phenol groups to each methylene group, as a part of the binder which is used in connection with a fibrous filler, such as asbestos. Such a fusible phenolic condensation product is not suited, when taken alone, to serve as a binder for a molding compound adapted to the practice of the quick-molding process. In accordance with the present invention, we produce a fusible, substantially anhydrous phenolic condensation product containing at least two phenolic groups, and preferably more than two phenolic groups, to each methylene group. Such a binder is sufficiently fluid to properly impregnate the filler; and such binder, together with a sufficient quantity of a methylene substance adapted to combine anhydrously with the binder, in such proportion that the binder shall contain approximately one methylene group to each phenolic group, is thoroughly mixed with a fibrous filler, organic or inorganic, or a mixture of organic and inorganic fillers, such as asbestos or wood flour, or a mixture of the same; and the molding compound, properly prepared, is subjected to a quick-molding operation under heavy pressure, at ordinary or desired temperature; and the molded article is then converted to a hard and practically infusible and insoluble state by prolonged heat treatment, after removal from the mold.

The fusible, substantially anhydrous phenolic condensation product which we prefer to employ as a binder, preferably contains about 2½ phenolic groups to each methylene group. This may vary, however, from a lower limit of about two phenolic groups to each methylene group to an upper limit of about 3½ phenolic groups to each methylene group.

It is not desirable in practice, however, to employ less than 2⅙ phenolic groups to each methylene group, or to employ more than 3 phenolic groups to each methylene group. Where the methylene body employed is hexamethylenetetramin, the ratio of 2½ phenolic groups to one methylene group corresponds with about one mol of hexamethylenetetramin to 15 mols of cresol.

The fusible, substantially anhydrous binder which it is preferred to employ in the practice of the process, is produced preferably as follows:

Mix 1080 pounds of cresol ($2CH_3C_6H_4OH$) and 140 pounds of hexamethylenetetramin ($(CH_2)_6N_4$); heat the mixture in a vessel or still, while stirring, to a temperature of 140° C.; then turn off the heat and allow the evolution of ammonia to proceed (the temperature automatically rising); apply further heat after the rapid evolution of ammonia ceases, continuing the heat at a temperature of preferably 165° C. for twelve to twenty-four hours; then raise the temperature gradually through a period of from four to seven hours, reaching a temperature of about 215° C. and discontinue the heat after substantially all of the methylene substance has combined; take 576 pounds of cresol and add to it the molten resin just described. This provides a fusible phenolic condensation product containing about one mol of hexa. to 15 mols of cresol, or 2½ phenolic groups to each methylene group.

Another method of obtaining the same result is to proceed as follows:

Mix 1080 pounds of cresol ($2CH_3C_6H_4OH$) and 93 pounds of hexamethylenetetramin ($(CH_2)_6N_4$); heat the mixture in a vessel or still, while stirring, to a temperature of 140° C.; then turn off the heat and allow the evolution of ammonia to proceed (the temperature automatically rising); apply further heat after the rapid evolution of ammonia ceases, continuing the heat at a temperature of preferably 165° C. for twelve to twenty-four hours; then raise the temperature gradually through a period of from four to seven hours, reaching a temperature of about 215° C. and discontinue the heat after the methylene substance has all combined. This gives a fusible anhydrous phenolic condensation product containing about one mol of hexamethylenetetramin to 15 mols of cresol, or about 2½ phenolic groups to each methylene group.

A less desirable method of producing a fusible, substantially anhydrous phenolic condensation product adapted for use in the practice of the process is as follows:

Boil together a 40% solution of formaldehyde and cresol, taken in such proportions as to afford about 2½ phenolic groups to each methylene group, continuing the re-action until the formaldehyde is practically all combined with the phenol; eliminate the water, as by drawing off the supernatant liquid and concentrating the resinous mass. This gives a fusible, substantially anhydrous resin, containing about 2½ phenolic groups to each methylene group. If the boiling operation is performed under conditions which will result in the loss of some of the formaldehyde, it is desirable to employ, in the first instance, somewhat more formaldehyde than corresponds with 2½ phenolic groups to each methylene group.

After obtaining a fusible, substantially anhydrous phenolic condensation product containing more than two phenolic groups to each methylene group, a molding compound adapted to a quick-molding operation and subsequent heat treatment after removal from the mold for hardening purposes may be produced by mixing with the fusible, substantially anhydrous resin a sufficient quantity of fibrous filler to give the desired consistence, and a sufficient quantity of a non-volatile methylene substance which will unite anhydrously with the fusible resin to produce a hard and substantially infusible phenolic condensation product. For illustration, one may take the fusible resin in melted condition, preferably at a temperature of about 150° F., and add thereto enough hexamethylenetetramin to make the binder, as whole, contain about one methylene group to each phenolic group, thus providing a potentially re-active binder, and this binder may be mixed with approximately three times its weight of asbestos. It is desirable to mix with the mass, also, a small quantity of a slowly volatile hydrocarbon solvent, that is, a hydrocarbon solvent of high boiling point, such as creosote oil, obtained by distillation of coal tars, asphalts, etc., such as creosote oil comprising mainly cyclic hydrocarbons. Such a solvent is useful in giving the fusible resin a desirable spreading and penetrating quality, and results in an improved product of increased tensile strength. Creosote oil may be most advantageously used when taken in the proportion of from 2% to 10%, and usually about 5%, by weight of the binder. The asbestos and the binder, including the creosote oil, may be thoroughly mixed in a suitable mixing machine, such operation usually requiring about one-half hour or somewhat longer to obtain a thorough mix. This mixing may be done at comparatively low temperature, such as a temperature from 100 to 140° F. In the mixing operation, the materials will ball up somewhat. After the mixing operation the material is preferably dried by passing warm air over it. The drying operation may require a greater or less period of time, depending upon the method employed. It is best not to employ too high a temperature, and the drying operation may require from one to several days' time. During this operation some change, partly physical and partly chemical, occurs. After the drying operation it is preferred to break up the material in a disintegrator to about 8 to 20 mesh, or finer. The material is then ready for molding, and is subjected to a quick-molding operation under a pressure usually of from 5000 to 15,000 pounds per square inch. The molding operation may be performed within a few seconds. The molded articles are then taken from the mold and subjected to heat treatment for a prolonged period of time, depending upon the degree of heat employed, the size of the article, etc. The molding operation may be performed in cold molds, or in moderately heated molds. When the molding is performed by introducing the material into molds which are not provided with heating means, which is the preferred method, it usually is advantageous to preliminarily heat the granulated molding mixture at a temperature of about 250° F. for a minute or two, and then introduce the material into the mold, which may be either cold, or which may have the temperature which it acquires from its use in molding the warmed molding compound. As stated, the molding operation may be performed in a few seconds, and an article will be produced which is sufficiently firm to be removed from the mold and to withstand the heat treatment to which it is subsequently subjected. The molded articles are placed in an oven, or kiln, and subjected to prolonged heat treatment, preferably at a temperature which is graduated and raised from time to time, starting at about 100° F. and raised to about 450° F. Usually such heat treatment should be continued through a period of from one hour to ten hours, or more, depending upon the size of the article, its uniformity of thickness, etc. The molded article may be finally subjected to the higher temperature noted, where the filler employed is asbestos. If an organic filler, such as wood flour, is employed, the highest temperature to which the molded article is subjected should not reach the point at which charring would occur. The curing operation may be performed in a much shorter time than that noted above, where the molded article is such as to permit it. For instance, it is feasible in the case of some articles to introduce them into the oven at a temperature of about 350° F. and raise the temperature to about 450° F., and a cure may be effected in from fifteen minutes to three hours, depending upon the size and thickness of the article. If metal inserts are used, or if the molded article has recesses, so that walls of varying thicknesses are present, more care is necessary in converting the binder to the final infusible condition, and a longer period of time for effecting a cure is necessary.

The use of a slowly volatile solvent having a relatively high boiling-point is desirable, both because of the increased spreading, diffusing, or impregnating quality which it gives to the binder, and also because the use of such solvent serves to keep the materials in proper condition for molding for a comparatively long period of time; and in the heat treatment after the molding operation, the solvent having a high-boiling point acts as a tempering agent, and will not be driven off readily, whereas, the more usual solvents, such as alcohol, acetone, or a mixture of the usual solvents, would be rapidly driven off during the heat treatment, thereby tending to greater porosity, blistering or deforming of the molded article. The solvent may be a light coal tar oil, or a higher boiling-point fraction known as "shingle-stain" oil. Any suitable oil derived from the distillation of coal tar or asphalt, with a boiling point which may range from about 135° C. or lower, to 270° C. may be employed. Such an oil usually comprises a mixture of cyclic hydrocarbons which cannot be designated by definite formula.

The heat treatment of the molded articles may be performed advantageously in a closed oven, kiln or vulcanizer. Usually it is desirable to make provision for the escape and collection of the ammonia which is given off during the baking operation. The ammonia may be collected and used again, for instance, in making a fresh supply of hexamethylenetetramin.

Any suitable filler, such as asbestos, mica, flock, wood pulp, etc., may be employed. It is desirable to use, ordinarily, a high proportion of filler. In the case of asbestos, an excellent product is obtained by using 75% by weight of asbestos and 25% by weight of binder. The proportions may vary, however. In the example given above, the binder is about one-third of the weight of the asbestos fiber.

The use of a solvent of the character referred to above imparts to the molding compound a quality which prevents injury to the dies in the molding operation, so that the sharp edges or corners of the dies will not wear off, and it is thus possible to preserve sharp outlines in the molded product for a very large number of operations. This is a very important consideration, and the result is doubtless due to the fact that the great body of the molding compound retains the solvent, even after there has been an apparent surface evaporation from the particles, or pellets, which make up the compound, so that the compound retains perfect plasticity and will not cut the dies, even though the molding operation has been long deferred.

As a concrete example of one method of practising the improved process, the following may be given:

Melt 11.4 pounds of a fusible anhydrous phenolic condensation product which corresponds with about 10 mols of cresol to one mol of hexamethylenetetramin; take 5.7 pounds of cresol and add thereto the melted resin, or phenolic condensation product; cool to a temperature below 150° F.; add to the molten mass about 2.2 pounds of hexamethylenetetramin, thus producing a potentially re-active binder containing about one methylene group to each phenolic group. This material, as a liquid, is of about the consistency of thin molasses, and has a specific gravity of about 1.09. Add the molten binder to about 50 pounds of asbestos, introducing also a pound or two of creosote oil; thoroughly mix the mass, subject it to a drying operation, and then disintegrate to desired mesh. This produces a granulated molding compound adapted to the quick-molding process. If desired, the material may be rolled into sheets, however, which may be warmed on a steam-table, balled up, and introduced into the molds.

As a concrete example of another method of reaching substantially the same result, the following may be given:

Prepare a fusible, substantially anhydrous resin corresponding with about one mol of hexamethylenetetramin to 15 mols of cresol, by boiling together 140 pounds of hexamethylenetetramin and 1620 pounds of cresol, until the hexamethylenetetramin is completely united with the cresol. Stir into the molten mass after suitably reducing the temperature, about 210 pounds of hexamethylenetetramin; mix the potentially re-active binder thus prepared with a suitable quantity of fibrous filler, such as asbestos, introducing a small quantity of creosote oil, if desired; subject the materials after the mixing operation to a drying operation; disintegrate the materials to desired mesh; subject to a quick-molding operation, using the materials either at ordinary room temperature or preparatorily heated before introduction into the molds; and after the quick-molding operation, subject the molded articles, after removal from the molds, to prolonged heat treatment to convert the articles to a hard and substantially infusible condition.

It will be noted that the fusible anhydrous resin is produced, in the first instance, by completely combining the methylene substance, which is originally used with the phenol, by boiling the materials together. Thus, by properly weighing the materials in the first instance, the boiling operation may be performed without danger of obtaining a condensation product in which the re-action has progressed beyond the stage where it is suitable for use in producing a cold molding compound. The fusible anhydrous phenolic condensation product may be shipped, in this condition, to manufacturers of molded products; and such manufacturers may readily perform the operation of mixing the fusible anhydrous condensation product with a sufficient quantity of hexamethylenetetramin to effect conversion to the final infusible state and the requisite amount of fibrous filler to give the desired consistency to the molding mixture and desired qualities to the molded product.

By using a fusible, substantially anhydrous phenolic resin and a methylene substance which will combine therewith in an anhydrous reaction, after the quick-molding operation has been performed, the curing operation may be readily performed without injury to the molded article, and a molded article will be produced which possesses high tensile strength, a high dielectric constant, and a body which has slight capability, if any, of water absorption. Any suitable phenolic body may be employed in producing the binder, such as phenol, or a homologue, cresols, or a mixture of cresols. Among the recognized equivalent phenolic bodies in the art may be mentioned phenol, the cresols, and the xylenols. The most desirable active methylene body for use in the process is the methylene-amin compound hexamethylenetetramin. Another instance of a non-volatile methylene-amin compound which is capable of being used in connection with the fusible anhydrous resin combining therewith by an anhydrous re-action is hydrobenzamid. It may be stated, however, that this latter substance is too expensive at the present time to be economically employed in the process.

Proportions of the fusible condensation product and the active methylene body employed may vary somewhat, but it is desirable to have approximately one methylene group to each phenolic group in the final product. The proportion of the filler to the binder may vary within rather wide limits, but usually it is desirable, both for economy and for facility in producing a suitable molding compound adapted to the quick-molding process, to employ a high percentage of filler. In the case of wood flour the filler and binder may be advantageously of about equal weights; and in the case of asbestos, 75 pounds of filler to 25 pounds of binder is a good ratio. The filler may vary, however, from about 30% of the weight of the molding compound to about 75%.

Where the molding compound is preparatorily warmed before subjecting it to the molding operation, it is desirable that the temperature of the molding compound shall not be raised so high as to cause any appreciable chemical re-action, as it is of utmost importance that the material shall be in such condition that the materials will properly weld together, which cannot be accomplished if the re-action proceeds too far before the pressure-molding operation is performed.

It is to be noted, also, that if the molding compound is heated to too high a temperature, either by preliminarily warming, or by using highly heated molds, the material will be rendered too sticky to give satisfactory results, or permit ready removal from the molds. It is desirable, therefore, that the molding compound, when artificially warmed, either preparatorily or in the molds, should be at a temperature of from 75° C. to about 105° C., and the most satisfactory temperature is approximately 100° C.

The foregoing detailed description has been given for clearness of understanding only, and no unnecessary limitation should be understood therefrom, but the appended claims should be construed as broadly as permissible, in view of the prior art.

What we regard as new, and desire to secure by Letters Patent, is:—

1. The process of producing a molded phenolic condensation product article, which comprises: mixing together a fibrous filler and a binder comprising a substantially anhydrous phenolic condensation product corresponding with the reaction between a phenolic body and a methylene body in proportions affording at least two phenolic groups to each methylene group and a non-volatile methylene body in sufficient quantity to give to the molding mixture approximately one methylene group to each phenolic group; subjecting the molding compound to a quick-molding operation to form a body; and subjecting the molded article, after removal from the mold, to prolonged heat treatment until a hard and substantially infusible body results.

2. The process of producing a molded phenolic condensation product article, which comprises: mixing together a fibrous filler and a binder comprising a substantially anhydrous phenolic condensation product corresponding with the reaction between a phenolic body and a methylene body in proportions affording at least two phenolic groups to each methylene group, a relatively small quantity of a slowly volatile solvent, and a non-volatile methylene body in sufficient quantity to give to the molding mixture approximately one methylene group to each phenolic group; subjecting the molding compound to a quick-molding operation to form a body; and subjecting the molded article, after removal from the mold, to prolonged heat treatment until a hard and substantially infusible body results.

3. The process of producing a molded phenolic condensation product article, which comprises: mixing together a fibrous filler and a binder comprising a substantially anhydrous phenolic condensation product corresponding with the reaction between a phenolic body and a methylene body in proportions affording at least two phenolic groups to each methylene group, a relatively small quantity of a hydrocarbon solvent having a high boiling-point, and a non-volatile methylene body in sufficient quantity to give to the molding mixture approximately one methylene group to each phenolic group; subjecting the molding compound to a quick-molding operation to form a body; and subjecting the molded article, after removal from the mold, to prolonged heat treatment until a hard and substantially infusible body results.

4. The process of producing a molded phenolic condensation product article, which comprises: producing a fusible substantially anhydrous phenolic condensation product corresponding with a reaction between a phenolic body and a methylene body in proportions affording at least two phenolic groups to each methylene group; mixing the same with a filler and a methylene body adapted to combine anhydrously with said condensation product, the methylene body being taken in sufficient quantity to give to the molding mixture approximately one methylene group to each phenolic group; subjecting the molding mixture to a quick-molding operation to form the body; and subjecting the molded article, after removal from the mold, to heat treatment, until a hard and substantially infusible body is produced.

5. The process of producing a molded phenolic condensation product article, which comprises: mixing together a fibrous filler and a binder comprising a fusible substantially anhydrous phenolic condensation product which corresponds with the union of at least approximately two phenolic groups to each methylene group, and hexamethylenetetramin in sufficient quantity to give the binder substantially one methylene group to each phenolic group; subjecting the molding compound to a quick-molding operation at room or moderate temperature; and subjecting the molded article, after removal from the mold, to relatively long heat treatment until a hard and substantially infusible body is obtained.

6. The process of producing a molded phenolic condensation product article, which comprises: mixing together a fibrous filler and a binder comprising a fusible substantially anhydrous phenolic condensation product which corresponds with the union of at least approximately two phenolic groups to each methylene group, a relatively small quantity of hydrocarbon solvent possessing a high boiling-point, and hexamethylenetetramin in sufficient quantity to give the binder substantially one methylene group to each phenolic group; subjecting the molding compound to a quick-molding operation at room or moderate temperature; and subjecting the molded article, after removal from the mold, to relatively long heat treatment until a hard and substantially infusible body is obtained.

7. The process of producing a molded phenolic condensation product article, which comprises: mixing together a fibrous filler and a binder comprising a fusible phenolic condensation product in which the methylene body employed in making such condensation product is substantially all combined with the phenolic body employed, said binder having present at least substantially two phenolic groups to each methylene group, and an uncombined methylene body adapted to re-act anhydrously in the binder; subjecting the mixture to a drying operation; subjecting the dried material to a disintegrating operation; subjecting the molding compound to a quick-molding operation at ordinary or moderate temperature; and subjecting the molded article, after removal from the mold, to heat treatment for a relatively long period to convert the body to a hard and substantially infusible state.

8. The process of producing a molded phenolic condensation product article, which comprises: mixing together a fibrous filler and a binder comprising unreacted hexamethylenetetramin and a phenolic condensation product in which substantially all of the methylene substance employed in making the condensation product is combined with the phenolic body employed, the binder containing more than two phenolic groups to each methylene group of the condensation product, and the unreacted hexamethylenetetramin being taken in sufficient quantity to afford substantially one methylene group to each phenolic group of the binder; drying and disintegrating the mixture; preliminarily heating the molding compound; subjecting the preliminarily heated molding compound to a quick-molding operation at ordinary or moderate temperature; and converting the molded article, after removal from the mold, to a hard and substantially infusible state by heat treatment.

9. The process of producing a molding compound adapted for producing molded articles by a quick-molding operation followed by heat treatment after removal of the article from the mold, which comprises: mixing a fibrous filler and a binder comprising unreacted hexamethylenetetramin and a fusible phenolic condensation product containing more than two phenolic groups to each methylene group in said condensation product; and drying and disintegrating the mixture.

10. The process of producing a molding compound adapted for producing molded articles by a quick-molding operation followed by heat treatment after removal of the article from the mold, which comprises: mixing a fibrous filler and a binder comprising unreacted hexamethylenetetramin and a fusible phenolic condensation product in which substantially all of the methylene substance employed in making said condensation product is combined with the phenolic body employed, the binder containing more than two phenolic groups to each methylene group in said condensation product and a relatively small quantity of a hydrocarbon solvent possessing a high-boiling point; and drying and disintegrating the mixture.

11. The process of producing a molded phenolic condensation product article, which comprises: mixing together a fibrous filler and a binder comprising a substantially anhydrous phenolic condensation product, the binder having at least substantially two phenolic groups to each methylene group, and a sufficient amount of hexamethylenetetramin to effect the conversion to a substantially infusible state; preparatorily heating the mixture without effecting the substantial conversion of the mass by chemical reaction; subjecting the compound to a quick-molding operation; and subjecting the molded article to heat treatment, after removal from the mold, until a substantially infusible body results.

LAWRENCE V. REDMAN.
ARCHIE J. WEITH.
FRANK P. BROCK.